US012468151B2

(12) United States Patent
Choi et al.

(10) Patent No.: US 12,468,151 B2
(45) Date of Patent: Nov. 11, 2025

(54) HEAD-UP DISPLAY DEVICE

(71) Applicant: LG ELECTRONICS INC., Seoul (KR)

(72) Inventors: Seungyul Choi, Seoul (KR); Juhyeok Ryu, Seoul (KR); Jaehyuk Lim, Seoul (KR); Taehyeok Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 325 days.

(21) Appl. No.: 18/007,424

(22) PCT Filed: Jul. 31, 2020

(86) PCT No.: PCT/KR2020/010147
§ 371 (c)(1),
(2) Date: Jan. 30, 2023

(87) PCT Pub. No.: WO2022/025329
PCT Pub. Date: Feb. 3, 2022

(65) Prior Publication Data
US 2023/0273429 A1    Aug. 31, 2023

(51) Int. Cl.
*B60K 35/00*    (2024.01)
*B60K 35/23*    (2024.01)
(Continued)

(52) U.S. Cl.
CPC ............... *G02B 27/01* (2013.01); *G02B 5/10* (2013.01); *G02B 7/198* (2013.01); *G02B 2027/0138* (2013.01); *G02B 2027/0145* (2013.01)

(58) Field of Classification Search
CPC .......... G02B 27/01; G02B 5/10; G02B 7/198; G02B 2027/0138; G02B 2027/0145
(Continued)

(56) References Cited

U.S. PATENT DOCUMENTS

2018/0267304 A1    9/2018   Sasaki
2018/0292650 A1*  10/2018  Sato ...................... B60K 35/231
(Continued)

FOREIGN PATENT DOCUMENTS

JP    2017-062455    3/2017
JP    2017-116626    6/2017
(Continued)

OTHER PUBLICATIONS

PCT International Application No. PCT/KR2020/010147, International Search Report dated Apr. 27, 2021, 4 page.
(Continued)

*Primary Examiner* — Stephone B Allen
*Assistant Examiner* — Leonidas Boutsikaris
(74) *Attorney, Agent, or Firm* — LEE, HONG, DEGERMAN, KANG & WAIMEY

(57) ABSTRACT

A head-up display device includes an imaging device configured to emit light to generate a plurality of virtual images, a first mirror configured to reflect the light of the imaging device, and a second mirror unit configured to reflect the light reflected from the first mirror unit to a windshield. The second mirror unit includes a mirror assembly including a concave mirror and a plate coupled to the concave mirror, a tilt mechanism coupled to the plate and being configured to tilt the plate and the concave mirror, a plurality of bonding portions provided between the plate and the concave mirror to bond the plate and the concave mirror.

2 Claims, 12 Drawing Sheets

(51) Int. Cl.
*G02B 5/10* (2006.01)
*G02B 7/198* (2021.01)
*G02B 27/01* (2006.01)

(58) Field of Classification Search
USPC .......................................................... 359/630
See application file for complete search history.

(56) References Cited

U.S. PATENT DOCUMENTS

2019/0129172 A1* 5/2019 Misawa .............. G02B 27/0149
2020/0144892 A1* 5/2020 Kim ..................... H05K 5/0226
2021/0003815 A1 1/2021 Tabata et al.

FOREIGN PATENT DOCUMENTS

| KR | 2017-0070306 | 6/2017 |
| KR | 10-2016258 | 10/2019 |
| KR | 2020-0052582 | 5/2020 |
| WO | 2019-091931 | 5/2019 |
| WO | 2019-189607 | 10/2019 |

OTHER PUBLICATIONS

European Patent Office Application Serial No. 20947486.5, Search Report dated Mar. 13, 2024, 6 pages.

* cited by examiner

[Fig. 1]
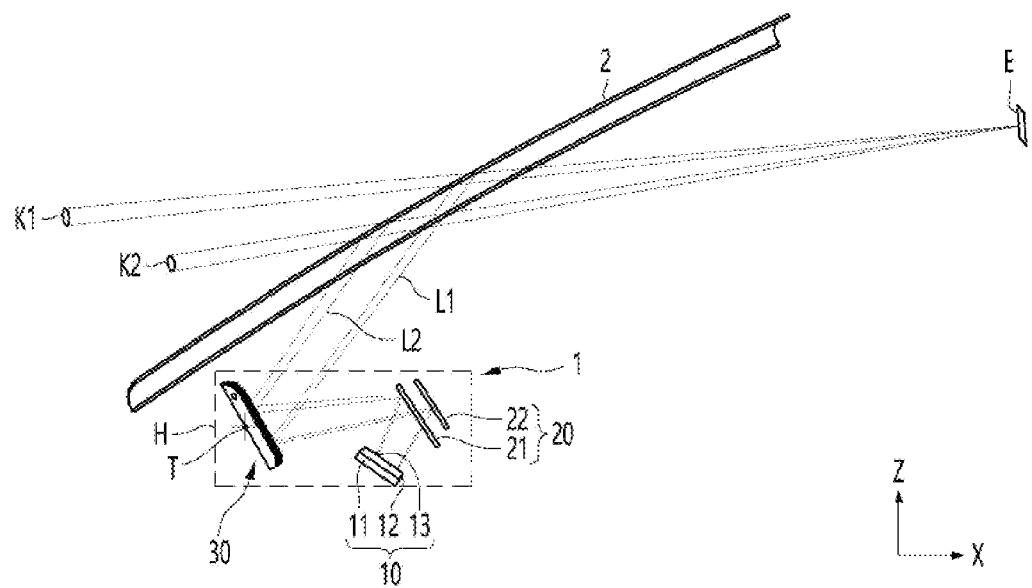
[Fig. 2]
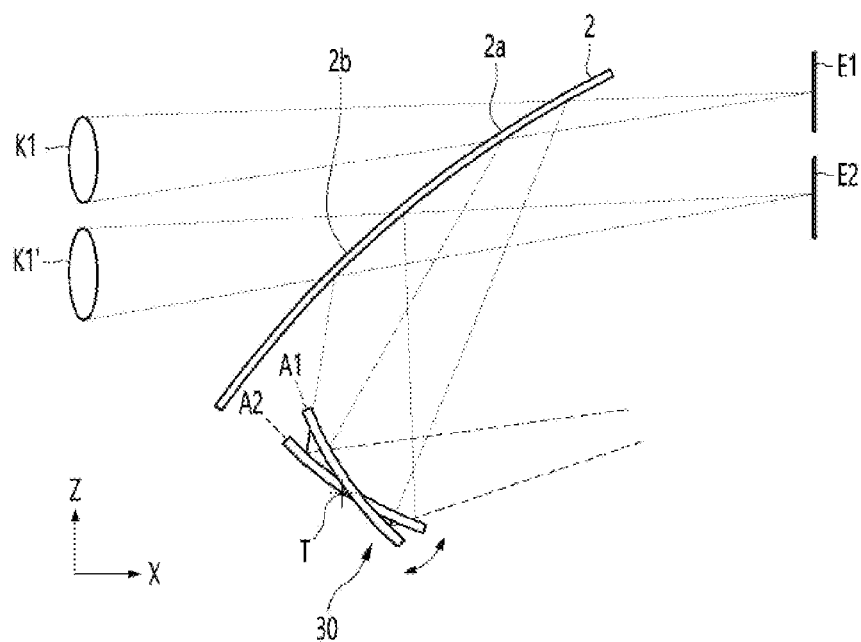

【Fig. 3】
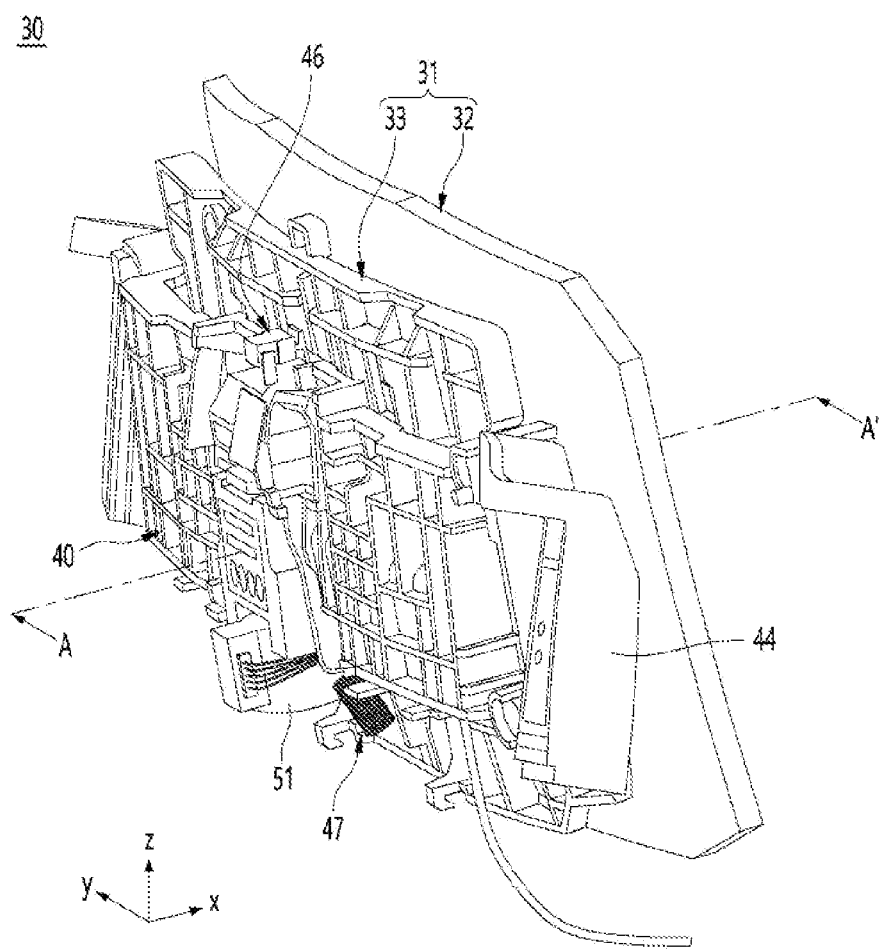

[Fig. 4]
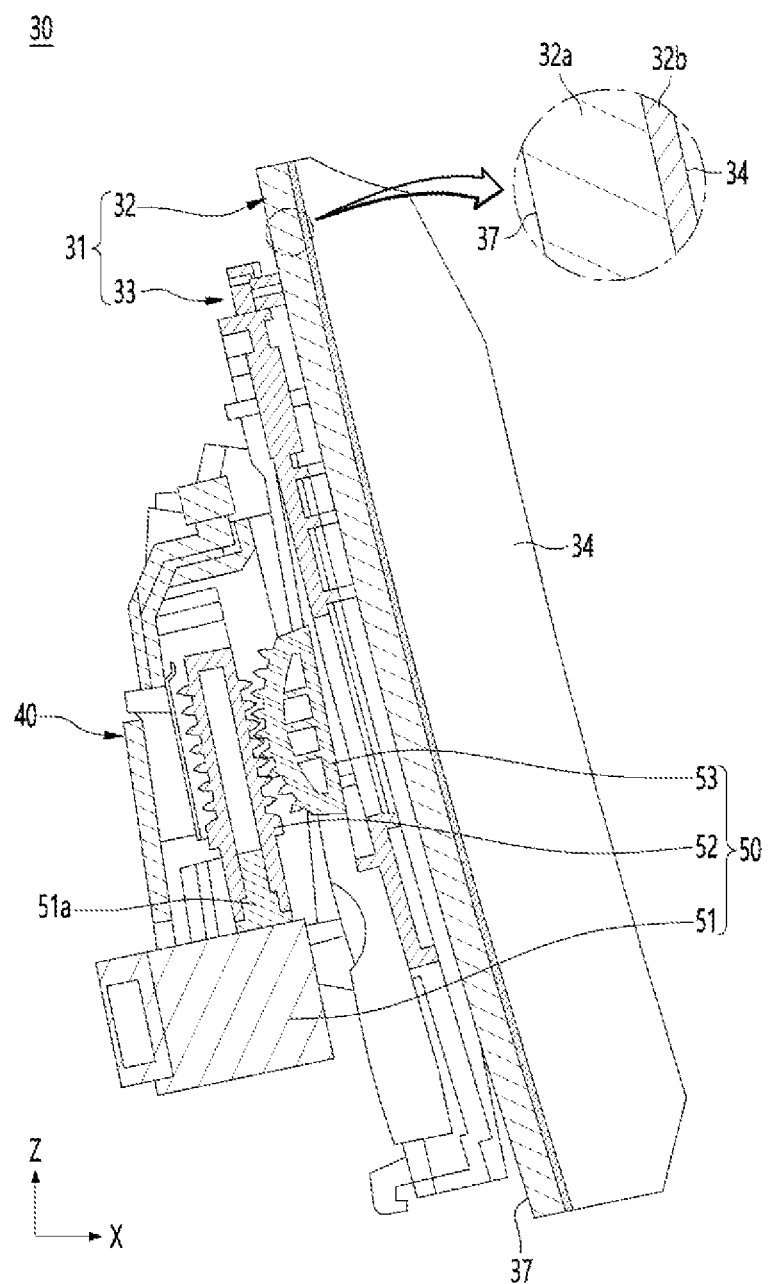

[Fig. 5]
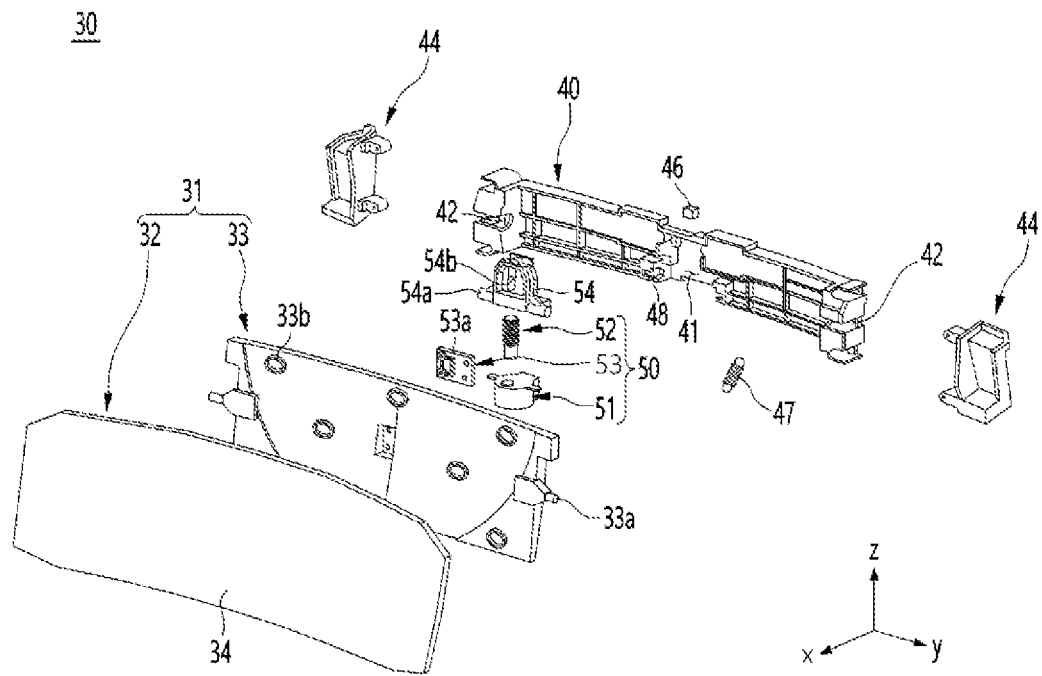
[Fig. 6]
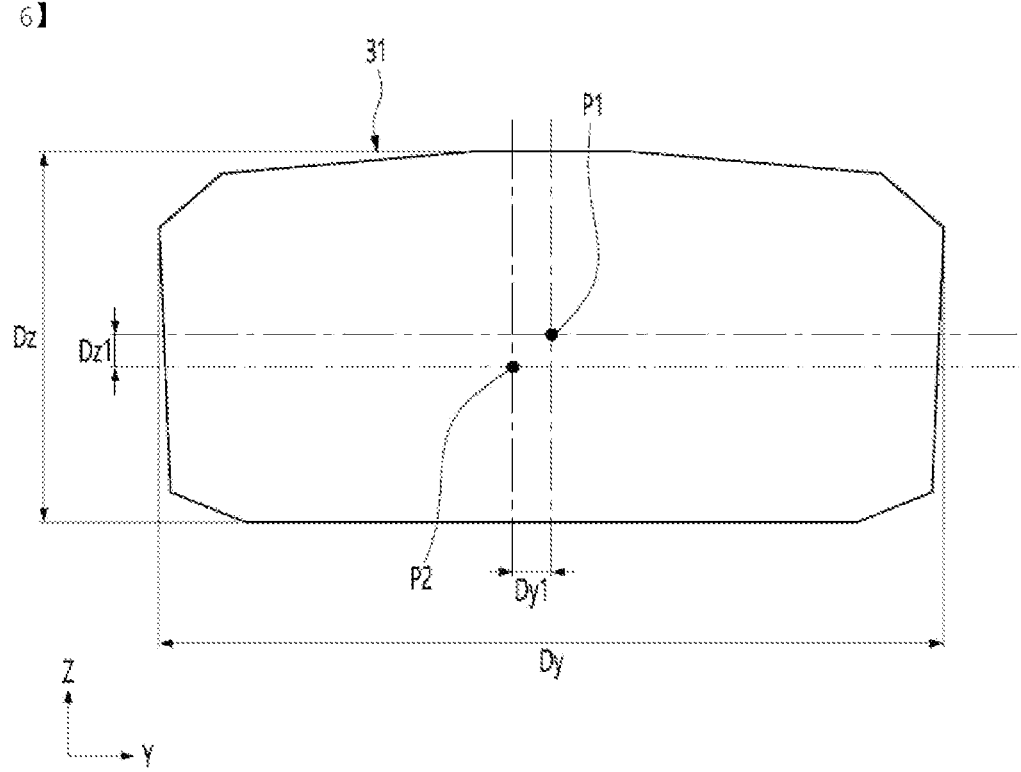

[Fig. 7]
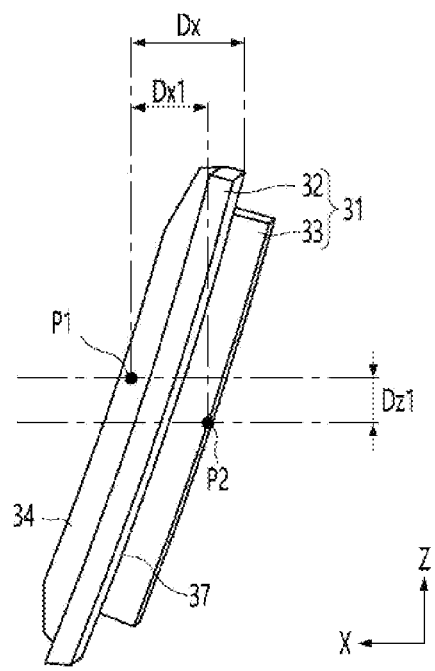
[Fig. 8]
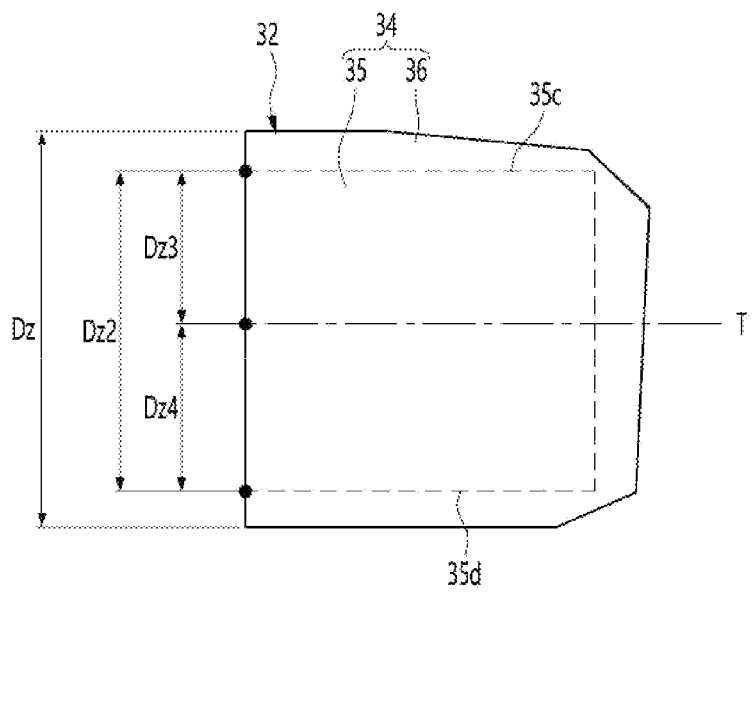

[Fig. 9]
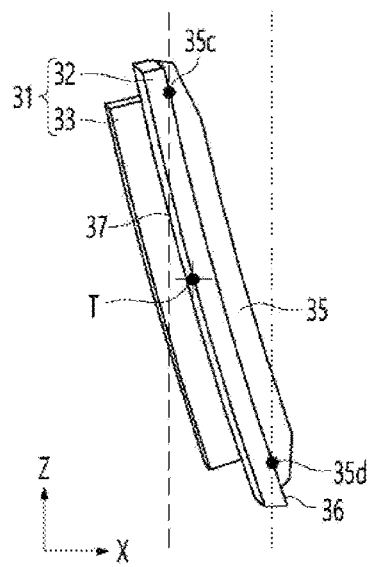
[Fig. 10]
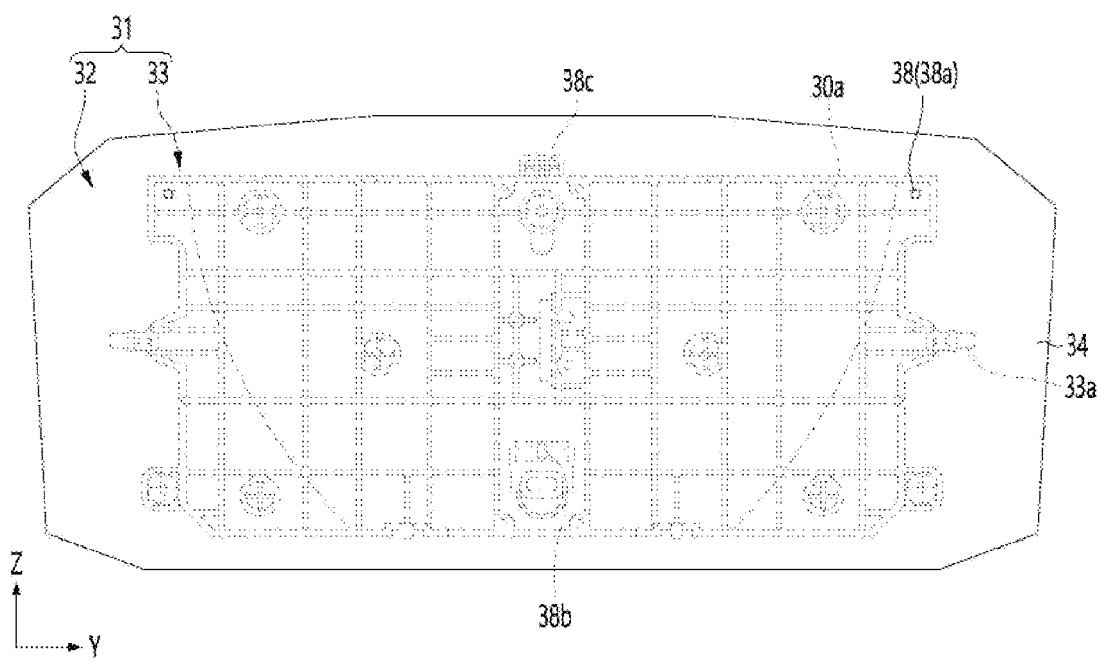

[Fig. 11]
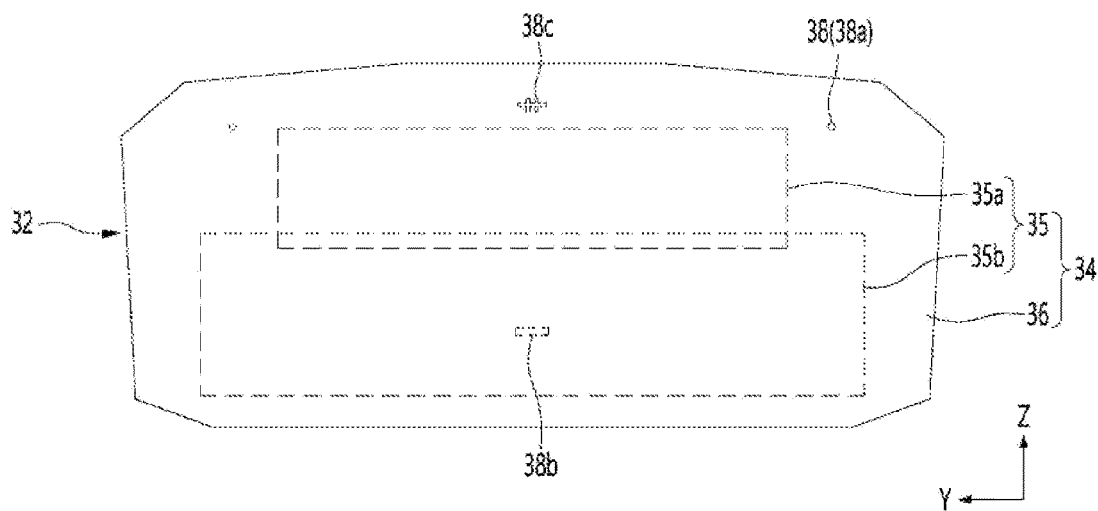
[Fig. 12]
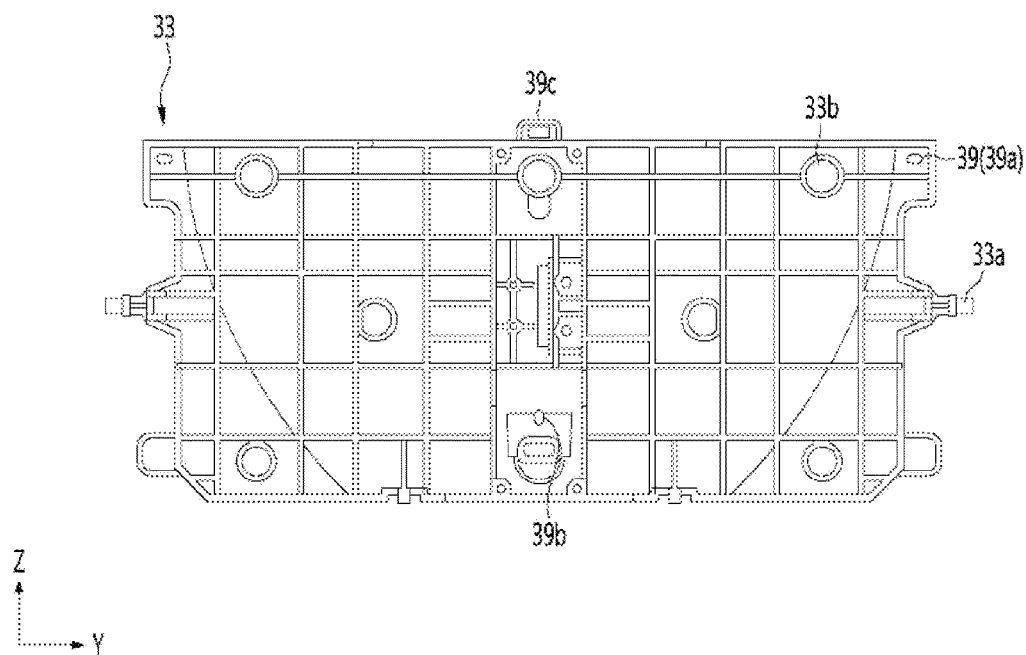

【Fig. 13】
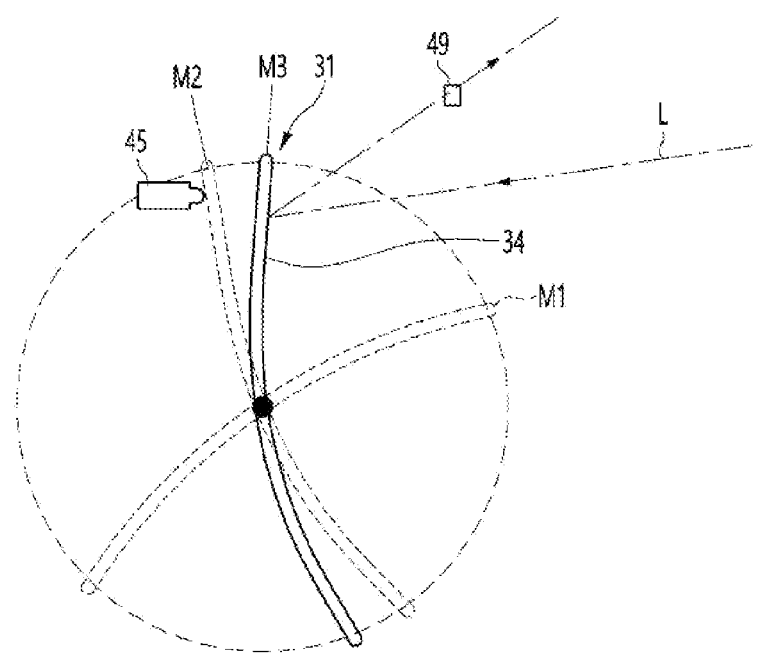
【Fig. 14】
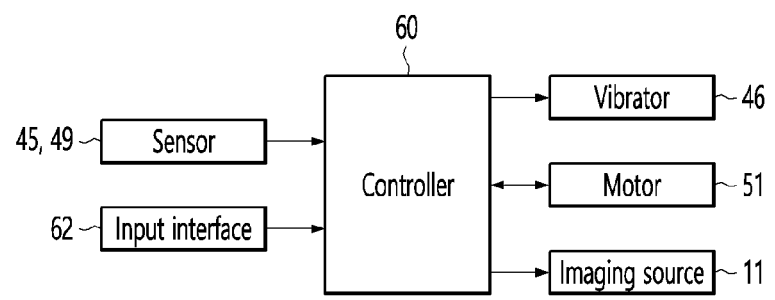

[Fig. 15]
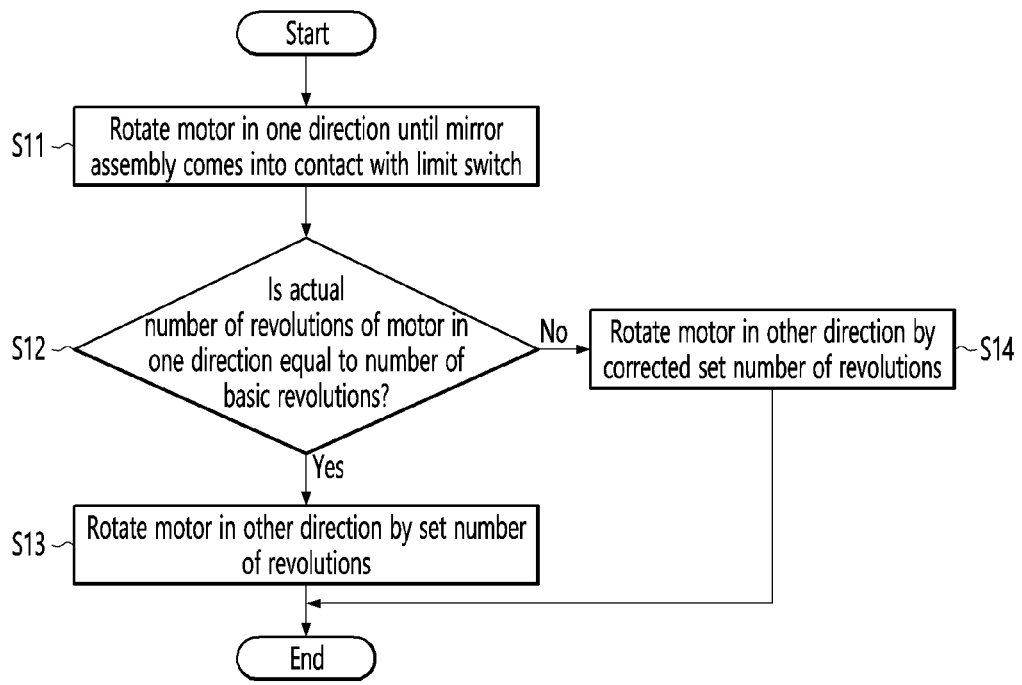

【Fig. 16】
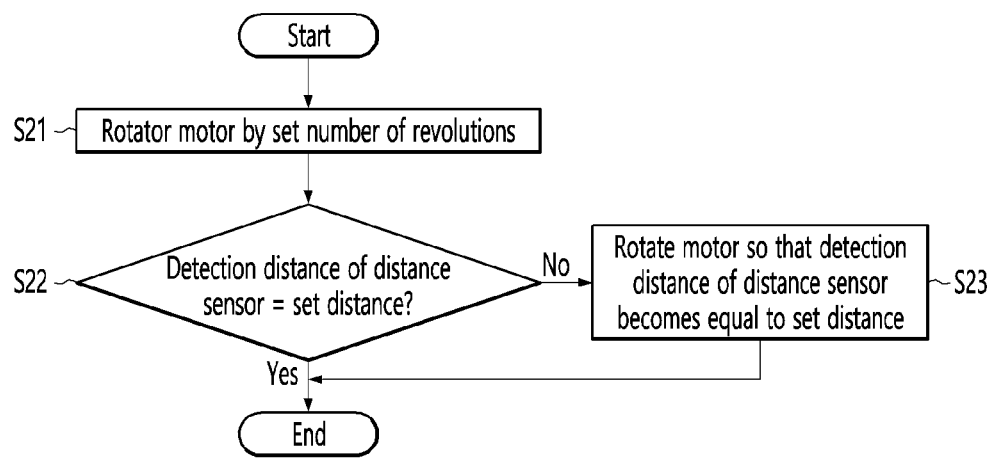
【Fig. 17】
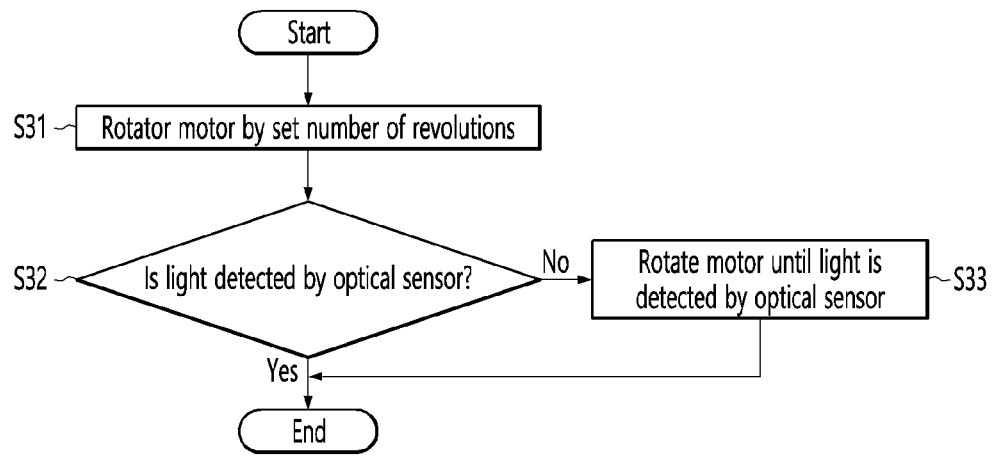

[Fig. 18]
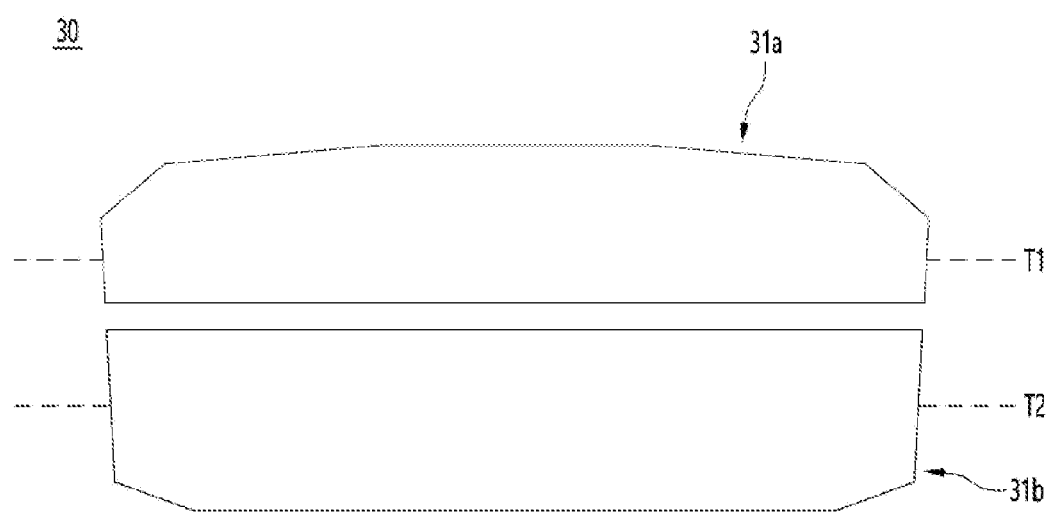

[Fig. 19]
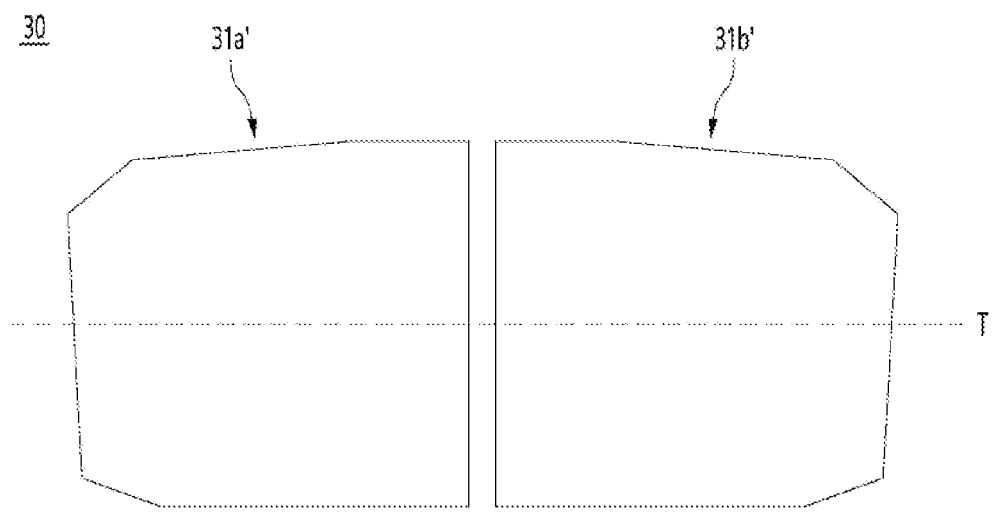
[Fig. 20]
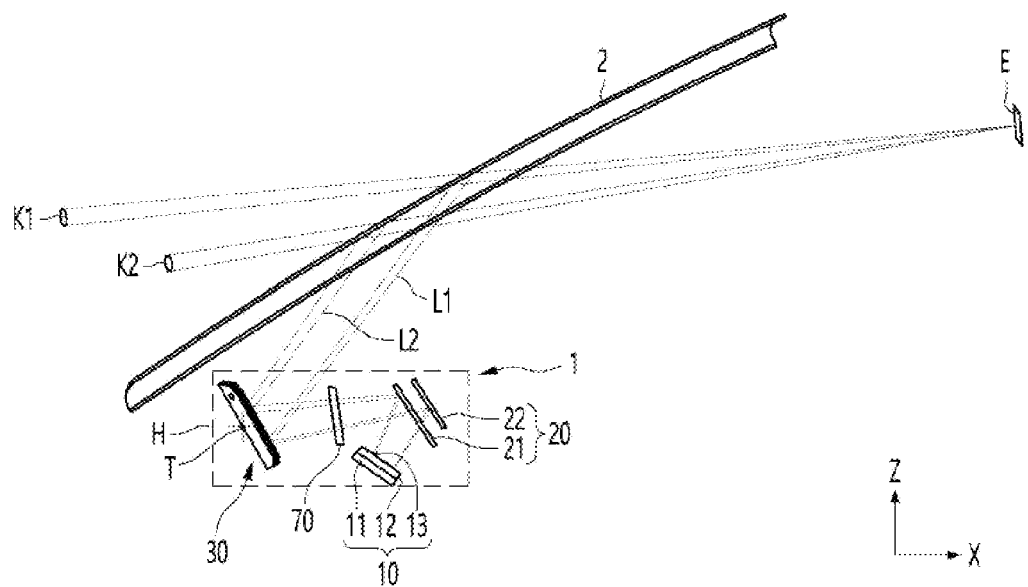

HEAD-UP DISPLAY DEVICE

CROSS-REFERENCE TO RELATED APPLICATIONS

This application is the National Stage filing under 35 U.S.C. 371 of International Application No. PCT/KR2020/010147, filed on Jul. 31, 2020, the contents of which is hereby incorporated by reference herein in its entirety.

FIELD OF THE INVENTION

The present description relates to a head-up display device.

DISCUSSION OF THE RELATED ART

A head-up display device is a device that is provided in a vehicle and emits image light toward a windshield of the vehicle. A head-up display for a vehicle may display various types of information including driving information while the vehicle is traveling. A head-up display device includes a display panel that generates and outputs image light, and at least one mirror from which the image light generated by the display panel is reflected. The image light generated by the display panel may be incident on a windshield of a vehicle through a mirror, and a driver may recognize a virtual image of a position in front of the windshield. When an imaging source of the head-up display device can generate a plurality of images, a plurality of virtual images can be projected onto the windshield of the vehicle. That is, since more information can be displayed, the convenience of the head-up display for a vehicle can be increased.

As such, a large-area mirror is required to generate a plurality of images. Therefore, a compact design is required to install a head-up display device including a large-area mirror in a limited space within a vehicle.

SUMMARY

A feature of the present disclosure is to provide a head-up display device capable of adjusting a height of a virtual image by tilting a mirror. Another feature of the present disclosure is to provide a head-up display device capable of tilting a large-area mirror while maintaining a compact size.

In a head-up display device, a tilt mechanism for tilting a mirror assembly may be disposed opposite a reflective surface of the mirror assembly.

In more detail, the head-up display device according to an embodiment may include an imaging device configured to emit light to generate at least one virtual image; a first mirror unit configured to reflect the light of the imaging device; and a second mirror unit configured to reflect the light reflected from the first mirror unit to a windshield. The second mirror unit may include: a mirror assembly including a concave mirror having a reflective surface for reflecting light reflected from the first mirror unit to the windshield, and a plate coupled to an opposite surface of the reflective surface with respect to the concave mirror; and a tilt mechanism disposed opposite the concave mirror with respect to the plate and connected to the plate to tilt the plate and the concave mirror.

The imaging device may be configured to emit light to generate a plurality of virtual images, and the reflective surface may include a plurality of reflective regions for reflecting the light reflected from the first mirror unit toward different positions of the windshield. The tilt mechanism may include: a motor; a rotating gear coupled to the plate; and at least one power transmission gear rotated by the motor and gear-coupled with the rotating gear. The mirror assembly may have a symmetrical shape, and the rotating gear may be coupled to a central portion of the plate with respect to a horizontal direction.

The rotating gear may be coupled to a center of gravity of the mirror assembly or a point adjacent to the center of gravity.

The reflective surface may include: a reflective region on which the light reflected from the first mirror unit is incident; and a non-reflective region located outside an edge of the reflective region. A tilt axis of the mirror assembly may pass between an upper edge and a lower edge of the reflective region with respect to a vertical direction and a front-and-rear direction. A vertical distance between the tilt axis of the mirror assembly and the lower edge of the reflective region may be greater than 40% of a vertical distance between the upper edge and the lower edge of the reflective region.

A vertical distance between the tilt axis of the mirror assembly and the upper edge of the reflective region may be less than 60% of a vertical distance between the upper edge and the lower edge of the reflective region. A plurality of bonding portions for bonding the concave mirror and the plate may be provided between the concave mirror and the plate, a plurality of restraining holes may be formed in the plate, and the concave mirror may be provided with a plurality of protrusions protruding in an opposite direction of the reflective surface and restrained to the plurality of restraining holes.

The plurality of bonding portions and the plurality of protrusions may be arranged symmetrically.

The reflective surface may include: a reflective region on which the light reflected from the first mirror unit is incident; and a non-reflective region located outside an edge of the reflective region. At least a part of the plurality of protrusions may be formed at positions corresponding to a non-reflective region.

The plurality of protrusions may include: a pair of first protrusions located closer to one edge of upper and lower edges of the concave mirror, formed at positions corresponding to the non-reflective region, and spaced apart horizontally; and a second protrusion located closer to the other edge of the upper and lower edges of the concave mirror, formed at positions corresponding to the reflective region, and located at a center of the concave mirror with respect to a horizontal direction.

The plurality of protrusions may further include a third protrusion located closer to the one edge of the upper and lower edges of the concave mirror and located at the center of the concave mirror with respect to the horizontal direction.

The reflective surface may include: a first region on which first light generating a first image is incident; and a second region on which second light generating a second image is incident and which has a larger area than the first region. The plurality of protrusions may include: a pair of first protrusions spaced apart from each other with the first region interposed therebetween; and a second protrusion formed at a position corresponding to the second region.

The first protrusion and the second protrusion may retrain the second mirror to the plate in different directions.

The head-up display device may further include: a limit switch disposed opposite the concave mirror with respect to the plate and selectively brought into contact with the mirror assembly according to a tilt of the mirror assembly; and a controller configured to rotate the motor in one direction until the mirror assembly comes into contact with the limit switch, and to rotate the motor in another direction by a set number of revolutions when the mirror assembly comes into contact with the limit switch. When an actual number of revolutions of the motor in the one direction is different from a preset number of basic revolutions, the controller may be configured to change the preset number of revolutions by a difference between the actual number of revolutions and the number of basic revolutions.

The head-up display device may further include: a distance sensor disposed opposite the concave mirror with respect to the plate and configured to sense a distance to the mirror assembly; and a controller configured to control the motor so that the distance sensed by the distance sensor reaches a set value.

The head-up display device may further include: an optical sensor disposed on the reflective surface or disposed on a path of the light reflected from the reflective surface to the windshield; and a controller configured to control the motor so that light is sensed by the optical sensor.

The second mirror unit may further include a support body to which the tilt mechanism is mounted and to which the plate is tiltably connected. The support body may be provided with at least one of a vibrator for damping vibration of the motor or a damper for absorbing vibration of the motor.

A head-up display device according to an embodiment of the present invention may include: an imaging device configured to emit light to generate a plurality of virtual images; a first mirror unit configured to reflect the light of the imaging device; and a second mirror unit configured to reflect the light reflected from the first mirror unit to a windshield. The second mirror unit may include: a plurality of concave mirrors configured to reflect the light reflected from the first mirror unit toward different positions of the windshield; a plurality of plates coupled to an opposite surface of the reflective surface with respect to the concave mirror; and a plurality of tilt mechanisms disposed opposite the concave mirror with respect to the plate and connected to the plate to tilt the plate and the concave mirror. The plurality of concave mirrors may reflect the light reflected from the first mirror unit toward different positions of the windshield.

According to an embodiment of the present invention, since a mirror assembly is tilted by a tilt mechanism, a height of a virtual image generated in front of a windshield can be varied. Accordingly, there is an advantage in that the height of the virtual image can be adjusted to match the height of a user's eyes.

In addition, the tilt mechanism can be located opposite a concave mirror with respect to a plate. Therefore, even when the concave mirror has a large area, it is possible to efficiently dispose the tilt mechanism within a limited space. That is, a head-up display can be compact.

In addition, the tilt mechanism may be connected to the plate coupled to the concave mirror without being directly connected to the concave mirror. Accordingly, it is possible to prevent the concave mirror from being deformed due to stress concentration generated by the tilt mechanism and to prevent deterioration of the virtual image.

In addition, the reflective surface of the concave mirror may include a plurality of reflective regions for reflecting light reflected from the first mirror unit toward different positions of the windshield. Accordingly, a plurality of virtual images can be generated at different positions by using a single concave mirror having a large area.

In addition, a rotating gear of the tilt mechanism may be coupled to the center of gravity of the mirror assembly or to a point adjacent to the center of gravity of the mirror assembly. Accordingly, rotational torque required to tilt the mirror assembly can be reduced.

In addition, a tilt axis of the mirror assembly may pass between an upper edge and a lower edge of the reflective region with respect to a vertical direction and a front-and-rear direction. Accordingly, when the mirror assembly is tilted, the heights of the plurality of virtual images may be uniformly adjusted while maintaining optical quality.

In addition, the concave mirror and the plate may be bonded to ach other by a plurality of bonding portions. Therefore, since a separate fixing structure is not required for the concave mirror, manufacturing tolerances can be minimized and the optical quality of the virtual image can be maintained high.

In addition, the plurality of protrusions formed on the concave mirror may be restrained in different directions to the restraining holes formed in the plate. Accordingly, it is possible to minimize stress imbalance of the concave mirror, which occurs during curing of the bonding portion or upon completion of curing, and to maintain high optical performance.

In addition, the plurality of bonding portions and protrusions are arranged bilaterally symmetrically to minimize stress imbalance of the concave mirror and maintain high optical performance.

In addition, at least a part of the plurality of protrusions may be formed at positions corresponding to non-reflective regions of the reflective surface. Accordingly, deterioration in the optical quality of the virtual image due to sink mark that may occur on the reflective surface in the process of forming the protrusion can be minimized.

In addition, the protrusion formed at a position corresponding to the reflective region may be located at the center of the concave mirror with respect to a horizontal direction. Accordingly, the influence of the sink mark in the reflective region on the optical quality of the virtual image can be minimized.

In addition, even when the mirror assembly is slightly deformed due to long-term use or environmental changes, a tilt position of the mirror assembly may be corrected by at least one of a distance sensor, an optical sensor, or a limit switch.

BRIEF DESCRIPTION OF DRAWINGS

FIG. 1 shows a head-up display device according to an embodiment of the present invention.

FIG. 2 depicts operation of a second mirror unit according to an embodiment of the present invention.

FIG. 3 is a perspective view of a second mirror unit according to an embodiment of the present invention.

FIG. 4 is a cross-sectional view taken along line A-A' of FIG. 3.

FIG. 5 is an exploded perspective view of the second mirror unit according to an embodiment of the present invention.

FIGS. 6 and 7 are diagrams showing a position where a torque of a tilt mechanism occurs, according to an embodiment of the present invention.

FIGS. 8 and 9 are diagrams for showing a position of a tilt axis of a mirror assembly, according to the embodiment of the present invention.

FIG. 10 is a front view of a mirror assembly according to an embodiment of the present invention.

FIG. 11 is a rear view of the concave mirror shown in FIG. 10.

FIG. 12 is a front view of the plate shown in FIG. 10.

FIG. 13 is a diagram showing the arrangement of a sensor according to an embodiment of the present invention.

FIG. 14 is a block diagram of a head-up display device according to an embodiment of the present invention.

FIGS. 15 to 17 are flowcharts for operating a head-up display device according to an embodiment of the present invention.

FIGS. 18 and 19 are diagrams showing a mirror assembly according to another embodiment.

FIG. 20 is a diagram of a head-up display device according to a further embodiment of the present invention.

DETAILED DESCRIPTION

Hereinafter, detailed embodiments will be described in detail with reference to the accompanying drawings. Hereinafter, an expression "an element is "coupled" or "connected" to another element" may means that the two elements are directly coupled or connected to each other, or may mean that a third element is present between the two elements and the two elements are coupled or connected to each other by the third element. On the other hand, when it is described that one element is "directly coupled" or "directly connected" to another element, it may be understood that a third element is not present between the two elements.

In addition, the x-axis shown in the drawings may be parallel to the front-and-back direction, the y-axis may be parallel to the left-and-right direction, and the z-axis may be parallel to the vertical direction. FIG. 1 shows a head-up display device according to an embodiment of the present invention. A head-up display device 1 may be used to display a lane in an augmented reality navigation system such as a smart vehicle or to generate visual information to help steering of an autonomous (or other) vehicle.

In addition, the head-up display device 1 may be used to help safe and comfortable driving by tracking visual information in a device including an artificial intelligence system installed for in-vehicle driving assistance or fully autonomous driving.

The head-up display device 1 may emit image light toward a windshield 2 of the vehicle. The windshield 2 may be a window disposed to face the front inside portion of the vehicle. A driver's eyes E may look at the outside of the front inside portion of the vehicle through the windshield 2, and may view virtual images K1 and K2 formed in front of the windshield 2 by the head-up display device. The head-up display device 1 may be accommodated in an instrument housing H (hereinafter referred to as 'housing') in front of a driver's seat of the vehicle, and may emit image light (e.g., L1, L2) toward the windshield 2. The housing H may include a transparent window through which light emitted from the head-up display device 1 passes.

The head-up display device 1 according to an embodiment of the present invention may include an imaging device 10, a first mirror unit 20, and a second mirror unit 30.

The imaging device 10 may emit light to generate at least one virtual image, preferably a plurality of virtual images K1 and K2. The imaging device 10 may generate the virtual images K1 and K2 to be displayed on the windshield 2 in consideration of positions of both eyes E of the user in order to provide a 3D image to the user. The imaging device 10 may emit linearly polarized light in a first direction and linearly polarized light in a second direction perpendicular to the first direction. The imaging device 10 may face an oblique direction between rearward and upward.

In more detail, the imaging device 10 may include an imaging source 11 that emits image light, and polarizing members 12 and 13 that polarize a part and another part among pieces of image light emitted from the imaging source 11 to directions perpendicular to each other. The imaging source 11 is a picture generating unit (PGU), such as a liquid crystal display (LCD) panel, a light emitting diode (LED) panel, or an organic light emitting diode (OLED) panel, which may generate image light by controlling electrical signals.

The imaging source 11 may include a display element and a light source that emits light to the display element. The light source may be a backlight unit (BLU) that may emit light toward the display element. The polarizing members 12 and 13 may polarize a part of the light emitted from the imaging source 11 in a first direction and polarize another part thereof in a second direction perpendicular to the first direction.

For example, the polarizing members 12 and 13 may include a linear polarizer 12 polarizing the image light emitted from the imaging source 11 in the first direction, and a phase retarder 13 (e.g., a half wave plate (HWP)) that performs half-wavelength conversion on a part of the linearly polarized light of the first direction emitted from the linear polarizer 12 into a second direction perpendicular to the first direction.

In more detail, the linear polarizer 12 may pass only the linearly polarized light of the first direction among pieces of image light emitted from the imaging source 11. Non-polarized light may be emitted from the imaging source 11, and the non-polarized light may be polarized in the first direction by the linear polarizer 12.

The linear polarizer 12 may be provided inside the display element included in the imaging source 11. In this case, the linearly polarized light polarized by the linear polarizer 12 may be emitted from the display element.

On the other hand, the linear polarizer 12 may also be disposed outside the display element included in the imaging source 11. In this case, the non-polarized light emitted from the display element may be incident on the linear polarizer 12, and the linearly polarized light polarized in the first direction may be emitted from the linear polarizer 12.

The half-wavelength phase retarder 13 may delay the linearly polarized light passing through the linear polarizer 12 by ½ wavelength.

The half-wavelength phase retarder 13 may face a partial area of the linear polarizer 12. Therefore, a part of the linearly polarized light of the first direction passing through the linear polarizer 12 may pass through the half-wavelength phase retarder 13 and may be polarized in the second direction perpendicular to the first direction, and another part of the linearly polarized light of the first direction passing through the linear polarizer 12 may remain a state of being polarized in the first direction without passing through the half-wavelength phase retarder 13.

However, the configuration of the polarizing members 12 and 13 is not limited thereto. As another example, the polarizing members 12 and 13 may include a first polarizer for polarizing a part of the image light emitted from the imaging source 11 in the first direction, and a second polarizer for polarizing another part of the image light emitted from the imaging source 11 in the second direction perpendicular to the first direction. In this case, the first polarizer may direct a partial area of the imaging source 11 and the second polarizer may direct another partial area of the imaging source 11.

Due to the polarizing members 12 and 13, the imaging device 10 may emit first light L1 and second light L2 polarized in directions perpendicular to each other. The first light L1 may generate a first virtual image K1 in front of the windshield 2, and the second light L2 may generate a second virtual image K2 in front of the windshield 2.

On the other hand, the first mirror unit 20 may reflect the light of the imaging device 10 toward the second mirror unit 30 (described below). The first mirror unit 20 may cause a difference in optical paths of the first light L1 and the second light L2 emitted from the imaging device 10. The first mirror unit 20 may face an inclined direction between forward and downward. In more detail, the first mirror unit 20 may include a polarization reflection mirror 21 and a first mirror 22.

The polarization reflection mirror 21 may be a beam splitter that transmits either one of the first light L1 and the second light L2 emitted from the imaging device 10 and reflects the other one. Hereinafter, a case where the polarization reflection mirror 21 transmits the first light L1 and reflects the second light L2 will be described as an example.

The polarization reflection mirror 21 may include one surface from which the second light L2 is reflected and another surface located opposite the one surface. The first mirror 22 may be located opposite the one surface to the polarization reflection mirror 21. That is, the first mirror 22 may be disposed to face the other surface of the polarization reflection mirror 21.

The first mirror 22 may be a flat mirror. The first mirror 22 may be disposed parallel to the polarization reflection mirror 21. The first mirror 22 may be spaced apart from the polarization reflection mirror 21.

The first light L1 emitted from the imaging device 10 may pass through the polarization reflection mirror 21, may be incident on the first mirror 22, and may be reflected by the first mirror 22. The first light L1 reflected by the first mirror 22 may re-transmit through the polarization reflection mirror 21 and may be incident to the second mirror unit 30. That is, the polarization reflection mirror 21 may be located between the first mirror 22 and the second mirror unit 30 in the path of the first light L1. In more detail, the polarization reflection mirror 21 may be located between the first mirror 22 and the second mirror 32 (see FIG. 3) to be described below with respect to the path of the first light L1. On the other hand, the second light L2 emitted from the imaging device 10 may be reflected by the polarization reflection mirror 21 and may be incident on the second mirror unit 30.

Accordingly, the path of the first light L1 may be longer than the path of the second light L2. Accordingly, the first virtual image K1 generated by the first light L1 may be located farther from the windshield 2 than the second virtual image K2 generated by the second light L2.

The second mirror unit 30 may reflect the light reflected from the first mirror unit 20 toward the windshield 2. That is, the first light L1 and the second light L2 may be reflected from the second mirror unit 30 and may be incident on the windshield 2 to generate the first virtual image K1 and the second virtual image K2. The second mirror unit 30 may face an inclined direction between rearward and upward.

The second mirror unit 30 may be tilted with respect to a horizontal tilt axis T. Accordingly, the heights of the virtual images K1 and K2 formed in front of the windshield 2 may be varied. FIG. 2 depicts operation of a second mirror unit according to an embodiment of the present invention.

In FIG. 2, only the first virtual image K1 is shown for convenience of explanation, and the description will be given based on the first virtual image K1. However, those of ordinary skill in the art will be able to easily understand the second virtual image K2 (see FIG. 1) therefrom. As described above, the second mirror unit 30 faces an inclination direction between rearward and upward, and may be tilted with respect to the horizontal tilt axis T.

As the direction toward which the second mirror unit 30 faces becomes closer to horizontal, the height of the virtual image K1 may decrease.

More specifically, when the second mirror unit 30 has a first slope A1, the light reflected from the second mirror unit 30 may be incident on a first area 2a of the windshield 2. On the other hand, when the second mirror unit 30 has a second slope A2 that is gentler than the first slope A1, the light reflected by the second mirror unit 30 may be incident on a second area 2b of the windshield 2. The second area 2b may be located at a lower height than the first area 2a. Therefore, in a case where the second mirror unit 30 has the first slope A1, when the second mirror unit 30 is at the second slope A2, the virtual image K1 may be generated at a position higher than the virtual image K1'. That is, the second mirror unit 30 may be tilted at the first slope A1 in accordance with the relatively high eye E1, and the second mirror unit 30 may be tilted at the second slope A2 in accordance with the relatively low eye E1.

Accordingly, there is an advantage in that it is possible to appropriately vary the heights of the virtual images K1 and K2 according to the heights of the eyes E of the user. FIG. 3 is a perspective view of the second mirror unit according to an embodiment of the present invention, FIG. 4 is a cross-sectional view taken along line A-A' of FIG. 3, and FIG. 5 is an exploded perspective view of the second mirror unit according to an embodiment of the present invention.

Hereinafter, a detailed configuration of the second mirror unit 30 will be described with reference to FIGS. 3 to 5.

The second mirror unit 30 may include a mirror assembly 31, a support body 40 that tiltably supports the mirror assembly 31, and a tilt mechanism 50 for tilting the mirror assembly 31 relative to the support body 40. The mirror assembly 31 may have a symmetrical shape. In more detail, the mirror assembly 31 may have a bilaterally symmetrical shape.

The mirror assembly 31 may include a second mirror 32 and a plate 33.

The second mirror 32 may be a concave mirror. That is, a reflective surface 34 of the second mirror 32 may be concave. The reflective surface 34 may reflect light reflected from the first mirror unit 20 (see FIG. 1) toward the windshield 2. The reflective surface 34 may be an aspherical curved surface.

In more detail, the second mirror 32 may include an injection-molded mirror body 32a and a deposition layer 32b deposited on one surface of the mirror body 32a. The deposition layer 32b may include the reflective surface 34 of the second mirror 32, and the mirror body may include the other surface 37 of the second mirror 32. The other surface 37 may be located opposite the reflective surface 34.

Accordingly, compared to a case where the second mirror 32 is integral, there is an advantage in that the design and manufacture of the reflective surface 34 may be facilitated and the coupling operation of the plate 33 to be described below is facilitated. The plate 33 may be coupled to the surface of the second mirror 32 opposite to the reflective surface 34. That is, the plate 33 may be coupled to the other surface 37 of the second mirror 32.

The size of the plate 33 may be smaller than the size of the second mirror 32.

The plate 33 may include one surface facing the second mirror 32 and the other surface located opposite the one surface. A plurality of reinforcing ribs may be formed on the other surface of the plate 33 in order to reinforce the rigidity of the plate 33. Accordingly, deterioration of the quality of the virtual images K1 and K2 (see FIG. 1) due to deformation of the plate 33 due to external environmental changes or external force can be minimized. The tilt mechanism 50 to be described below may be connected to the plate 33. Assuming that the tilt mechanism 50 is directly connected to the other surface 37 of the second mirror 32 without the plate 33, stress concentration may occur in the second mirror 32 at a point where the rotational torque of the tilt mechanism 50 is transmitted. Due to this, the second mirror 32 is deformed and the reflective surface 34 is distorted, so that the quality of the virtual images K1 and K2 (see FIG. 1) may deteriorate.

To prevent this, the plate 33 may connect the tilt mechanism 50 and the second mirror 32 between the tilt mechanism 50 and the second mirror 32.

The plate 33 may include a pair of connecting shafts 33a. The pair of connecting shafts 33a may extend horizontally. The pair of connecting shafts 33a may protrude in opposite directions from both edges of the plate 33 and may be rotatably connected to the support body 40 to be described below.

The support body 40 may be located opposite the second mirror 32 with respect to the plate 33. The support body 40 may have a symmetrical shape. In more detail, the support body 40 may have a bilaterally symmetrical shape. The plate 33 may be tiltably connected to the support body 40. In more detail, a pair of connecting grooves 42 to which the pair of connecting shafts 33a of the plate 33 are connected may be formed in the support body 40.

In addition, the support body 40 may be fixed inside the housing H. In more detail, the support body 40 may be fixed inside the housing H by a pair of side brackets 44. The tilt mechanism 50 may be connected to the mirror assembly 31, more specifically, the plate 33. The tilt mechanism 50 may change angles of the plate 33 and the second mirror 32.

The tilt mechanism 50 may be disposed opposite the concave mirror 32 with respect to the plate 33. More specifically, the tilt mechanism 50 may be disposed opposite the concave mirror 32 with respect to the central portion of the plate 33.

Therefore, compared to a case where the tilt mechanism 50 is located on the side of the mirror assembly 31, the width of the second mirror unit 30 in the left-and-right direction can be more compact. Accordingly, space utilization of the inner space of the housing H (see FIG. 1) can be improved, and the large-area second mirror unit 30 can be efficiently disposed.

In addition, compared to a case where the tilt mechanism 50 is located on the side of the mirror assembly 31, since the tilt mechanism 50 is covered by the mirror assembly 31 from the user's point of view, it may be advantageous in terms of blocking of noise and vibration generated by the tilt mechanism 50.

The tilt mechanism 50 may include a motor 51, a rotating gear 53 coupled to the plate 33, and at least one power transmission gear 52 for transmitting the rotational force of the motor 51 to the rotating gear 53. Hereinafter, a case where at least one power transmission gear 52 is a single worm gear 52 will be described as an example.

The motor 51 may be a step motor. The motor 51 may have a rotational shaft 51a extending in a vertical direction or in a direction inclined with respect to the vertical direction. For example, the rotational shaft 51a of the motor 51 may extend in a forward inclined direction toward the upper side.

The rotating gear 53 may be a helical gear, but is not limited thereto. The rotating gear 53 may include a coupling part 53a coupled to the plate 33.

The worm gear 52 may be connected to the rotational shaft 51a of the motor 51 and may be engaged with the rotating gear 53. The worm gear 52 may extend in a vertical direction or an inclined direction with respect to the vertical direction, similarly to the rotational shaft 51a of the motor 51.

When the rotational shaft Ma of the motor 51 and the worm gear 52 rotate in one direction, the rotating gear 53 may rotate clockwise (see FIG. 4), and the mirror assembly 31 may be tilted so that the direction in which the reflective surface 34 faces is close to horizontal.

On the other hand, when the rotational shaft 51a of the motor 51 and the worm gear 52 rotate in the other direction, the rotating gear 53 may rotate counterclockwise (see FIG. 4), and the mirror assembly 31 may be tilted so that the direction of the reflective surface 34 is close to vertical.

The motor 51 may be mounted on the support body 40 by bracket 54. A mounting space 41 in which the bracket 54 can be mounted may be formed in the support body 40. The mounting space 41 may be formed in the central portion of the support body 40. The mounting space 41 may be opened downward. In addition, the mounting space 41 may be opened toward the plate 33.

The bracket 54 mounted in the mounting space 41 may be located between the support body 40 and the plate 33. The motor 51 may be coupled to the lower portion of the bracket 54. The motor 41 may be located on the lower side of the support body 40, and more specifically, the mounting space 41.

The bracket 54 may be provided with a pair of connecting shafts 54a. The pair of connecting shafts 54a may extend horizontally. The pair of connecting shafts 54a may protrude in opposite directions from both edges of the bracket 54 and may be rotatably connected to the support body 40. In more detail, a pair of connecting grooves 48 to which the pair of connecting shafts 54a of the bracket 54 are connected may be formed in the support body 40.

That is, the bracket 54 may be tiltably connected to the support body 40. Accordingly, the bracket 54 and the tilt mechanism 50 coupled thereto may be tilted together with the mirror assembly 31 relative to the support body 40.

The bracket 54 may have an inner space in which the worm gear 52 is accommodated. That is, the worm gear 52 may be accommodated inside the bracket 54. In addition, an opening 54b opened toward the plate 33 may be formed in the bracket 52. The worm gear 52 and the rotating gear 53 may be gear-coupled with each other through the opening 54b. The second mirror unit 30 may further include at least one of a vibrator 46 and a damper 47.

The vibrator 46 may damp vibration of the motor 51. The vibrator 46 may be provided on the support body 40. In more detail, an acceleration sensor (not shown) may be provided on the support body 40, and the vibrator 46 may be controlled to vibrate in a phase opposite to the vibration detected by the acceleration sensor.

The damper 47 may absorb vibration of the motor 51 and prevent the vibration of the motor 51 from being transmitted to the mirror assembly 31. The damper 47 may be a spring connecting the support body 40 and the plate 33. However, the present invention is not limited thereto, and the damper 47 may be an elastic body (e.g., rubber) provided around the coupling part of the rotating gear. FIGS. 6 and 7 are diagrams showing a position where a torque of a tilt mechanism occurs, according to an embodiment of the present invention. The tilt mechanism 50 (see FIGS. 4 and 5) may transmit rotational torque to the central portion of the mirror assembly 31. More specifically, the tilt mechanism 50 may be connected to the central portion of the mirror assembly 31 with respect to the horizontal direction.

Accordingly, it is possible to prevent distortion of the virtual images K1 and K2 (see FIG. 1) due to the deformation of the mirror assembly 31 by the rotational torque transmitted from the tilt mechanism 50.

In addition, since the mirror assembly 31 has a symmetrical shape in the horizontal direction, the center of gravity P1 of the mirror assembly 31 may be located at the center of the mirror assembly 31 in the horizontal direction.

A point P2 at which the rotational torque of the tilt mechanism 50 is transmitted to the mirror assembly 31 may refer to a portion to which the rotating gear 53 is coupled to the coupling part 53a. The point P2 may coincide with the center of gravity P1 of the mirror assembly 31, or may be adjacent to the center of gravity P1. Hereinafter, for convenience of explanation, the center of gravity P1 of the mirror assembly 31 is referred to as a 'first point', and the point P2 to which the rotational torque of the tilt mechanism 50 is transmitted is referred to as a 'second point'. In more detail, a left-and-right distance Dy1 between the first point P1 and the second point P2 may be less than half of a left-and-right width Dy of the mirror assembly 31. In addition, a vertical distance Dz1 between the first point P1 and the second point P2 may be less than half of a vertical distance Dz between the upper edge and the lower edge of the mirror assembly 31. In addition, a front-and-rear distance Dx1 between the first point P1 and the second point P2 may be less than a front-and-rear distance Dx between the first point P1 and the upper or lower edge of the mirror assembly 31.

Accordingly, rotational torque required for the tilt mechanism 50 to tilt the mirror assembly 31 is reduced, and the mirror assembly 31 is smoothly tilted. FIGS. 8 and 9 are diagrams for showing a position of a tilt axis of a mirror assembly, according to the embodiment of the present invention.

The reflective surface 34 of the second mirror 32 may include a reflective region 35 on which light reflected from the first mirror unit 20 (see FIG. 1) is incident, and a non-reflective region 36 located outside the edge of the reflective region 35. The reflective region 35 may include a central portion of the reflective surface 34. The position where the light reflected from the first mirror unit 20 is incident may be at least a part of the reflective region 35, and may vary in the reflective region 35 depending on the tilt of the mirror assembly 31.

The non-reflective region 35 may include an edge of the reflective surface 34. The non-reflective region 35 may be located between the edge of the reflective surface 34 and the edges 35c and 35d of the reflective region 35.

The edges 35c and 35d of the reflective region 35 may refer to outermost peripheries of the reflective region 35. A vertical distance Dz2 between the upper edge 35c and the lower edge 35d of the reflective region 35 may be less than a vertical distance Dz of the second mirror 32.

The tilting axis T of the mirror assembly 31 may extend left and right, and may pass inside the edges 35c and 35d of the reflective region 35. The tilting axis T may be a virtual axis and may be determined according to the shape of the rotating gear 53.

In more detail, the tilting axis T of the mirror assembly 31 may be located between the upper edge 35c and the lower edge 35d of the reflective region 35 in the vertical direction.

In more detail, a vertical distance Dz3 between the tilt axis T of the mirror assembly 31 and the upper edge 35c of the reflective region 35 may be less than 60% of a vertical distance Dz between the upper and lower edges of the reflective surface 34. In addition, a vertical distance Dz4 between the tilt axis T of the mirror assembly 31 and the lower edge 35d of the reflective region 35 may be greater than 40% of a vertical distance Dz2 between the upper edge 35c and the lower edge 35d of the reflective region 35.

In addition, the tilt axis T of the mirror assembly 31 may be located between the upper edge 35c and the lower edge 35d of the reflective region 35 in the front-and-rear direction.

Accordingly, there is an advantage in that when the mirror assembly 31 is tilted, the heights of the plurality of virtual images K1 and K2 can be uniformly adjusted, and deterioration of the quality of each of the virtual images K1 and K2 can be prevented.

FIG. 10 is a front view of the mirror assembly according to an embodiment of the present invention, FIG. 11 is a rear view of a concave mirror shown in FIG. 10, and FIG. 12 is a front view of a plate shown in FIG. 10. The mirror assembly 31 may include a plurality of bonding portions 30a for bonding the second mirror 32 and the plate 33. The plurality of bonding portions 30a may be provided between the second mirror 32 and the plate 33.

The plurality of bonding portions 30a may be spaced apart from each other. The plurality of bonding portions 30a may be disposed bilaterally symmetrically. A plurality of bonding areas 33b to which the plurality of bonding portions 30a are coated or attached may be formed on one surface of the plate 33.

Due to the plurality of bonding portions 30a, the large-area second mirror 32 and the plate 33 may be firmly coupled to each other without a separate fixing member (e.g., a screw or a latch). In addition, since the second mirror 32 does not include a configuration for coupling a separate fixing member, manufacturing tolerance of the second mirror 32 can be reduced and distortion of the optical system can be minimized.

In addition, a plurality of protrusions 38 may be formed on the second mirror 32, and a plurality of restraining holes 39 in which the plurality of protrusions 38 are restrained may be formed in the plate 33. The plurality of protrusions 38 may protrude from the second mirror 32 in a direction opposite to the reflective surface 34. That is, the plurality of protrusions 38 may protrude toward the plate 33.

The plurality of protrusions 38 may be spaced apart from each other and may be disposed bilaterally symmetrically. Similarly, the plurality of restraining holes 39 may be spaced apart from each other and may be disposed bilaterally symmetrically.

Stress imbalance generated during or after curing of the plurality of bonding portions 30a may be minimized by the restraining force between the protrusion 38 and the restraining hole 39. Accordingly, the reflective surface 34 of the second mirror 32 is prevented from being distorted, and quality deterioration of the optical system can be minimized.

On the other hand, as described above, the second mirror 32 may include an injection-molded mirror body 32a (see FIG. 4) and a deposition layer 32b deposited on one surface of the mirror body 32a. In addition, the plurality of protrusions 38 may be integrally formed with the second mirror 32, and more specifically, the mirror body 32a. That is, during the injection molding process of the mirror body 32a, the plurality of protrusions 38 may also be formed.

Therefore, in the process of injection-molding the plurality of protrusions 38, a sink mark may be generated on one surface of the mirror body 32a, and the reflective surface 34 may be distorted. In order to minimize the deterioration of the quality of the optical system due to the distortion of the reflective surface 34, at least a part of the plurality of protrusions 38 may be formed at positions corresponding to the non-reflective regions 36.

For example, the plurality of protrusions 38 may include a pair of first protrusions 38a formed at positions corresponding to the non-reflective regions 36, and a second protrusion 38b formed at a position corresponding to the reflective region 35. The plurality of protrusions 38 may further include a third protrusion 38c. The pair of first protrusions 38a may be spaced apart from each other in the horizontal direction. The pair of first protrusions 38a may be spaced apart from each other with the reflective region 35 interposed therebetween.

The second protrusion 38b may be located at the center of the second mirror 32 in the horizontal direction. That is, the pair of first protrusions 38a and the second protrusion 38b may be disposed to form an inverted triangle or a triangle.

The third protrusion 38c may be located opposite the second protrusion 38b with respect to an imaginary line connecting the pair of first protrusions 38a.

Like the second protrusion 38b, the third protrusion 38c may also be located at the center of the second mirror 32 in the horizontal direction. Accordingly, it is possible to minimize the influence of the sink mark generated by the second protrusion 38b and the third protrusion 38c on the quality of the optical system.

The second protrusion 38a may be more adjacent to one of the upper and lower edges of the second mirror 32, and the pair of first protrusions 38a and the third protrusion 38c may be more adjacent to the other of the upper and lower edges of the second mirror 32.

In more detail, the positions of the plurality of protrusions 38 may be determined according to a position of a gate during injection molding of the mirror body 32a. The gate may refer to an entrance through which molding resin flows into the mold, and may refer to a portion that is cured within the gate and attached to an injection-molded product.

The gate may be located at one of the upper and lower edges of the second mirror 32. In this case, the second protrusion 38a may be more adjacent to the one edge, and the pair of first protrusions 38a and the third protrusion 38c may be more adjacent to the other edge.

That is, the number of protrusions 38b formed close to one edge where the gate is located may be smaller than the number of protrusions 38a and 38c formed near the other edge opposite to the one edge. In the molding process of the injection-molded product, generally the degree of deformation during curing is greater at a portion closer to the gate. Accordingly, due to the arrangement of the plurality of protrusions 38, it is possible to minimize the sink mark caused by the plurality of protrusions 38.

On the other hand, the reflective region 35 may include a first reflective region 35a from which the first light L1 (see FIG. 1) is reflected, and a second reflective region 35b from which the second light L2 is reflected.

The area of the first reflective region 35a may be smaller than the area of the second reflective region 35b. In more detail, the length of the first reflective region 35a in the horizontal direction may be shorter than the length of the second reflective region 35b in the horizontal direction.

The first reflective region 35a may be located above or below the second reflective region 35b. In addition, the first reflective region 35a and the second reflective region 35b may partially overlap each other. However, the present example is not limited thereto.

The pair of first protrusions 38a may be spaced apart from each other with the first reflective region 35a interposed therebetween. The second protrusion 38b may be formed at a position corresponding to the second reflective region 35b.

At least a part of the plurality of protrusions 38 may be restrained to the plurality of restraining holes 39 in different directions. For example, the pair of first protrusions 38a may be restrained to the pair of first restraining holes 39a in the front-and-rear and vertical directions, the second protrusion 38b may be restrained to the second restraining hole 39b in the front-and-rear direction, and the third protrusion 38c may be restrained to the third restriction hole 39c in the horizontal direction. Since the shapes of the protrusions 38 and the restraining holes 39 for restraining in different directions can be arbitrarily selected by those of ordinary skill in the art, a detailed description thereof will be omitted.

Therefore, since the restraining force between the plurality of protrusions 38 and the plurality of restraining holes 39 acts in various directions, stress imbalance generated during or after curing of the plurality of bonding portions 30a can be uniformly minimized in various directions. FIG. 13 is a diagram for explaining the arrangement of a sensor according to an embodiment of the present invention.

The head-up display device 1 according to the present embodiment may further include at least one sensor 45, 49, or both. The sensors 45 and 49 may be configured to detect the position of the mirror assembly 31. For example, the sensors 45 and 49 may include at least one of a distance sensor 45 or an optical sensor 49.

The distance sensor 45 may be disposed to face the mirror assembly 31 and may detect the distance to the mirror assembly 31. More specifically, the distance sensor 45 may be disposed opposite the second mirror 32 with respect to the plate 33 (see FIG. 4). The distance sensor 45 may be mounted on the support body 40.

The distance sensor 45 may be replaced with a limit switch 45 that is turned on when the mirror assembly 31 comes into contact therewith. That is, since the limit switch 45 detects that the distance to the mirror assembly 31 becomes 0, the limit switch 45 may replace the role of the distance sensor 45. Hereinafter, for convenience of description, the same reference numeral '45' is used to denote the distance sensor 45 and the limit switch 45.

The optical sensor 49 may be disposed in the path of the light L that is incident on the mirror assembly 31, and more specifically, the second mirror 32, or is reflected from the second mirror 32, and may detect the light L.

On the other hand, when the operation of the head-up display device 1 is stopped, the mirror assembly 31 may be located in an inactive position M1. For example, when the vehicle is not started, the mirror assembly 31 may be located in the inactive position M1.

The reflective surface 34 of the mirror assembly 31 in the inactive position M1 may face downward or may face in an inclined direction between downward and backward. Accordingly, it is possible to prevent sunlight from being incident on the reflective surface 34 of the mirror assembly 31.

When the head-up display device 1 starts operating, the mirror assembly 31 in the inactive position M1 may be tilted in one direction (counterclockwise direction based on FIG. 13) and moved to the initial position M2, and then, may be tilted in the opposite direction (clockwise direction based on FIG. 13) and moved to the active position M3. The initial position M2 may be a position where the limit switch 45 is turned on.

However, it is also possible for the mirror assembly 31 to move directly from the inactive position M1 to the active position M3. In this case, the head-up display device 1 may not include the limit switch 45.

The active position M3 may be a position where the head-up display 1 normally operates. That is, the mirror assembly 31 in the active position M3 may reflect light reflected from the first mirror unit 20 (see FIG. 1) toward the windshield 2. The mirror assembly 31 may be tilted within the range of the active position M3 to adjust the heights of the virtual images K1 and K2.

The distance sensor 45 or the optical sensor 49 may determine whether the mirror assembly 31 is located within the range of the active position M3. In more detail, when the detection value of the distance sensor 45 is within a predetermined range or when light is detected by the optical sensor 49, the mirror assembly 31 may be in the active position M3.

FIG. 14 is a block diagram of the head-up display device according to an embodiment of the present invention, and FIGS. 15 to 17 are flowcharts for operating the head-up display device according to an embodiment of the present invention. The head-up display device 1 may include a controller 60 and an input interface 62. However, at least one of the controller 60 and the input interface 62 may be included in a vehicle equipped with the head-up display device 1.

The controller 60 may include at least one processor. The controller 60 may communicate with the sensors 45 and 49 to receive detection results of the sensors 45 and 49. The controller 60 may communicate with the input interface 62 to receive a user's command.

In addition, the controller 60 may control the motor 51, the vibrator 46, and the imaging source 11. Since each of the motor 51, the vibrator 46, and the imaging source 11 has been described above, the above descriptions are equally applied herein. The input interface 62 may be a component allowing a user to input a command. For example, the input interface 62 may include at least one of a button, a jog dial, a microphone, or a touch screen.

Hereinafter, the operation of the embodiment in which the limit switch 45 is included in the sensors 45 and 49 will be described with reference to FIGS. 13 to 15.

When an engine of a vehicle is turned on or when the user inputs an operation start command of the head-up display device 1 through the input interface 62, the controller 60 may rotate the motor 51 in one direction until the mirror assembly 31 comes into contact with the limit switch 45 (S11). That is, the mirror assembly 31 may be tilted from the inactive position M1 to the initial position M2. In addition, the controller 60 may compare a preset number of revolutions with an actual number of revolutions of the motor 51 counted until the mirror assembly 31 moves from the inactive position M1 to the initial position M2.

When the actual number of revolutions of the motor 51 in one direction is equal to the preset number of revolutions, the controller 60 may rotate the motor 51 in the other direction by a predetermined number of revolutions (S12) (S13).

As long as the mirror assembly 31 is not deformed, the actual number of revolutions may be equal to the number of basic revolutions. Therefore, when the motor 51 is rotated in one direction by the number of basic revolutions in the state in which the mirror assembly 31 is in the inactive position M1, the mirror assembly 31 may move to the initial position M2.

That is, when the actual number of revolutions is equal to the number of basic revolutions, the mirror assembly 31 is not deformed. Accordingly, when the motor 51 rotates in the other direction by the preset number of revolutions, the mirror assembly 31 may be tilted to the active position M3. On the other hand, if the mirror assembly 31 is slightly deformed due to long-term use of the head-up display device 1 or due to a change in the surrounding environment, even when the motor 51 is rotated by the preset number of revolutions in the initial position M2, the mirror assembly 31 may not reach the active position M3 or may leave the active position M3. That is, there are concerns that the quality of the optical system may deteriorate or normal operation may be impossible.

To avoid these concerns, when the actual number of revolutions of the motor 51 in one direction is different from the preset number of basic revolutions, the controller 60 may rotate the motor 51 in the other direction by the corrected set number of revolutions (S12) (S14).

In more detail, when the actual number of revolutions of the motor 51 in one direction is different from the preset number of basic revolutions, it may mean that the mirror assembly 31 is deformed. Accordingly, the controller 60 may calculate the corrected set number of revolutions by adding or subtracting the difference to the set number of revolutions. The controller 60 may rotate the motor 51 in the other direction by the corrected set number of revolutions in the state where the mirror assembly 31 is in the initial position M2. Due to this, the deformed mirror assembly 31 may normally move to the active position M3.

Hereinafter, the operation of the embodiment in which the distance sensor 45 is included in the sensors 45 and 49 will be described with reference to FIGS. 13, 14, and 16.

When an engine of a vehicle is turned on or when the user inputs an operation start command of the head-up display device 1 through the input interface 62, the controller 60 may rotate the motor 51 in one direction by the preset number of revolutions (S21).

Thereafter, the controller 60 may determine whether the detection distance of the distance sensor 45 is equal to a preset distance (S22).

When the detection distance of the distance sensor 45 is equal to the preset distance, the mirror assembly 31 may be in an active position M3. As long as the mirror assembly 31 is not deformed, when the motor 51 is rotated in one direction by the set number of revolutions in the state in which the mirror assembly 31 is in the inactive position M1, the mirror assembly 31 may move to the active position M3.

On the other hand, if the mirror assembly 31 is slightly deformed due to long-term use of the head-up display device 1 or due to a change in the surrounding environment, even when the motor 51 is rotated by the preset number of revolutions in the inactive position M1, the mirror assembly 31 may not reach the active position M3 or may leave the active position M3. That is, there are concerns that the quality of the optical system may deteriorate or normal operation may be impossible.

In order to prevent these concerns, when the detection distance of the distance sensor 45 is different from the set distance, the controller 60 may rotate the motor 51 so that the detection distance of the distance sensor 45 becomes equal to the set distance (S23). Due to this, the deformed mirror assembly 31 may normally move to the active position M3.

Hereinafter, the operation of the embodiment in which the optical sensor 49 is included in the sensors 45 and 49 will be described with reference to FIGS. 13, 14, and 17.

When an engine of a vehicle is turned on or when the user inputs an operation start command of the head-up display device 1 through the input interface 62, the controller 60 may rotate the motor 51 in one direction by the preset number of revolutions (S31).

Thereafter, the controller 60 may determine whether light is detected by the optical sensor 49 (S32).

When light is detected by the optical sensor 49, the mirror assembly 31 may be in the active position M3. As long as the mirror assembly 31 is not deformed, when the motor 51 is rotated in one direction by the set number of revolutions in the state in which the mirror assembly 31 is in the inactive position M1, the mirror assembly 31 may move to the active position M3.

On the other hand, if the mirror assembly 31 is slightly deformed due to long-term use of the head-up display device 1 or due to a change in the surrounding environment, even when the motor 51 is rotated by the preset number of revolutions in the inactive position M1, the mirror assembly 31 may not reach the active position M3 or may leave the active position M3. That is, there are concerns that the quality of the optical system may deteriorate or normal operation may be impossible.

In order to prevent these concerns, when light is not detected by the optical sensor 49, the controller 60 may rotate the motor 51 until light is detected by the optical sensor 49 (S33). Due to this, the deformed mirror assembly 31 may normally move to the active position M3. FIGS. 18 and 19 are diagrams showing a mirror assembly according to another embodiment.

As described above, the mirror assembly 31 may include a large-area second mirror 32. Compared to a small-area mirror, the large-area second mirror 32 may have a large amount of deformation in response to assembly or a change in the surrounding environment. In order to reduce the amount of deformation, the second mirror unit 30 according to the present embodiment may include a plurality of mirror assemblies 31a and 31b that are tilted independently of each other.

From this, those of ordinary skill in the art can easily understand that the second mirror unit 30 includes the plurality of tilt mechanisms 50 (see FIG. 4) that are driven independently of each other. In addition, the mirror assemblies 31 each may include a second mirror 32 and a plate 33.

The plurality of mirror assemblies 31a and 31b may be tiltably connected to a single support body 40. However, the present invention is not limited thereto, and the second mirror unit 30 may include a plurality of support bodies 40 to which the plurality of mirror assemblies 31a and 31b are rotatably connected.

For example, as shown in FIG. 18, the second mirror unit 30 may include a first mirror assembly 31a tilted with respect to the first tilt axis T1, and a second mirror assembly 31b tilted with respect to a second tilt axis T2 parallel to and spaced apart from the first tilt axis T1. It is to be understood that the mirror assembly 31 described in the previous embodiment is divided vertically.

As another example, as shown in FIG. 19, the second mirror unit 30 may include a first mirror assembly 31a' and a second mirror assembly 31b' tilted independently of each other with respect to the same tilt axis T. This may be understood that the mirror assembly 31 described in the previous embodiment is divided horizontally.

FIG. 20 is a diagram of a head-up display device according to a further embodiment of the present invention.

The head-up display device 1 according to the present embodiment may further include a polarization compensating member 70 for compensating polarization characteristics. The polarization compensating member 70 may be located between the first mirror unit 20 and the second mirror unit 30 with respect to the light path, or may be located between the second mirror unit 30 and the windshield 2.

The configuration of the polarization compensating member 70 is not limited and may vary as necessary. For example, the polarization compensating member 70 may include at least one of a retarder, an electrical polarization device, or a polarization film. The polarization compensating member 70 may be installed to facilitate additional assembly to the head-up display device 1 already installed in the vehicle. For example, a slot into which the polarization compensating member 70 is inserted may be provided in the housing H.

Therefore, when the head-up display 1 is deformed or deteriorated due to long-term use or environmental changes, a worker may additionally mount the polarization compensating member 70 to the housing H. Accordingly, the quality of the virtual images K1 and K2 generated by the head-up display device 1 can be maintained.

The above description is merely illustrative of the technical spirit of the present disclosure, and various modifications and changes can be made by those of ordinary skill in the art, without departing from the scope of the present disclosure.

Therefore, the embodiments disclosed in the present disclosure are not intended to limit the technical spirit of the present disclosure, but are intended to explain the technical spirit of the present disclosure. The scope of the technical spirit of the present disclosure is not limited by these embodiments.

The scope of the present disclosure should be interpreted by the appended claims, and all technical ideas within the scope equivalent thereto should be construed as falling within the scope of the present disclosure.

What is claimed is:

1. A head-up display device comprising:
an imaging device configured to emit light for generating at least one virtual image;
a first mirror configured to reflect the light emitted by the imaging device; and
a second mirror unit configured to reflect the light reflected from the first mirror to a windshield,
wherein the second mirror unit includes:
a mirror assembly including a concave mirror having a reflective surface for reflecting the light reflected from the first mirror to the windshield, and a plate coupled to the concave mirror at a side that is opposite that of the reflective surface;
a tilt mechanism coupled to the plate and being configured to tilt the plate and the concave mirror; and
a support body that couples to the tilt mechanism,
wherein the plate includes a pair of connecting shafts,
wherein the support body is fixed inside a housing,
which the plate is tiltably connected to the support body,
wherein a pair of connecting grooves to which the pair of connecting shafts of the plate are connected is formed in the support body.

2. A head-up display device comprising:
an imaging device configured to emit light for generating at least one virtual image;
a first mirror configured to reflect the light emitted by the imaging device; and
a second mirror unit configured to reflect the light reflected from the first mirror to a windshield,
wherein the second mirror unit includes:
a mirror assembly including a concave mirror having a reflective surface for reflecting the light reflected from the first mirror to the windshield, and a plate coupled to the concave mirror at a side that is opposite that of the reflective surface;
a tilt mechanism coupled to the plate and being configured to tilt the plate and the concave mirror; and
a support body that couples to the tilt mechanism,
wherein the tilt mechanism includes:
a motor mounted on the support body a bracket;
a rotating gear coupled to the plate; and
at least one power transmission gear rotated by the motor and a gear-coupled with the rotating gear,
wherein an opening opened toward the plate is formed in the bracket,
wherein the at least one power transmission gear and the rotating gear is gear-coupled with each other through the opening.

* * * * *